Sept. 13, 1949.  I. A. COOK  2,481,907
MOUSE TRAP
Filed Oct. 13, 1947
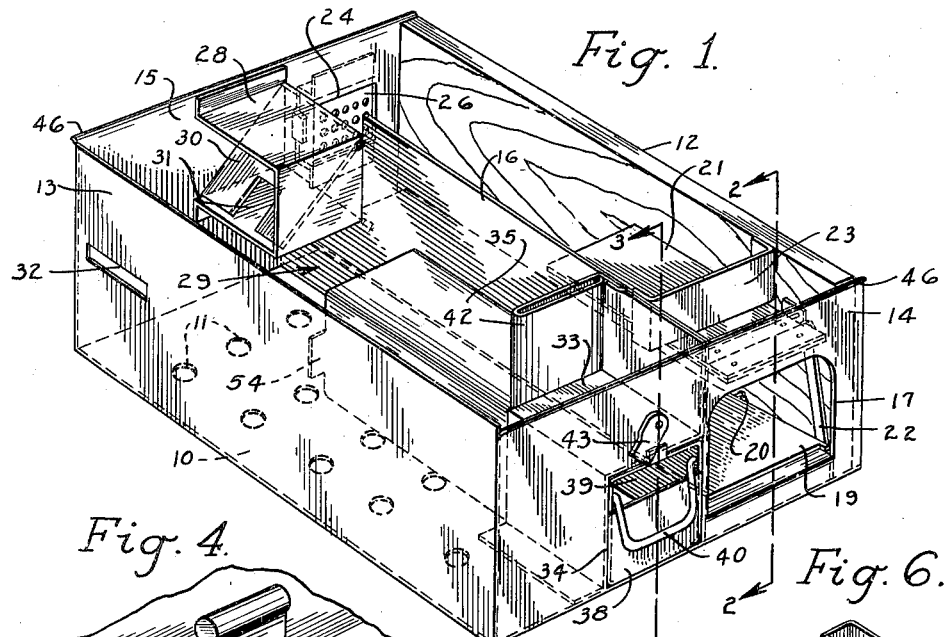
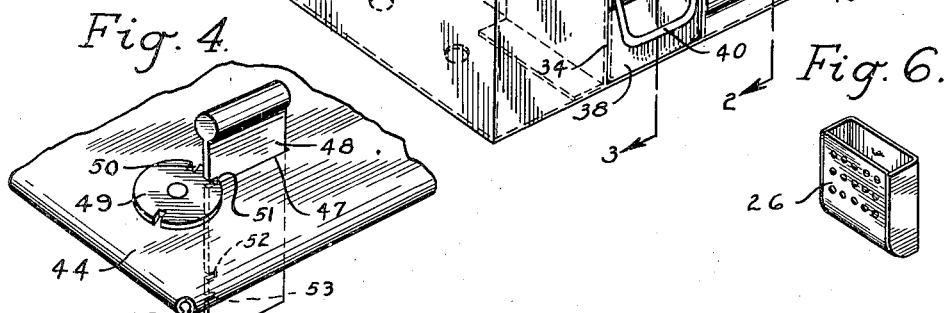
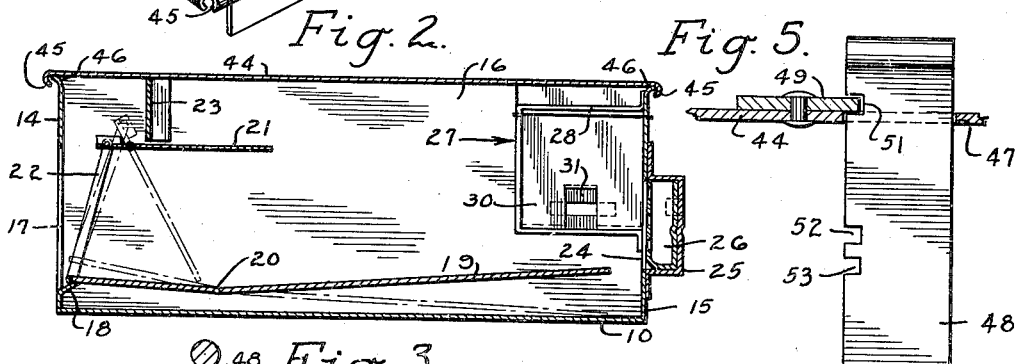
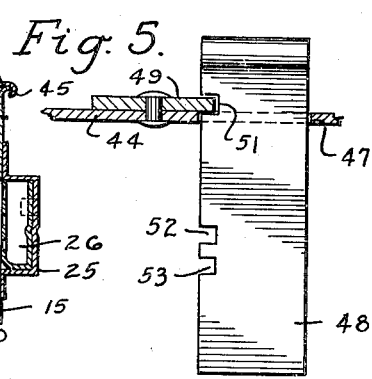
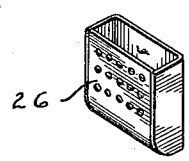
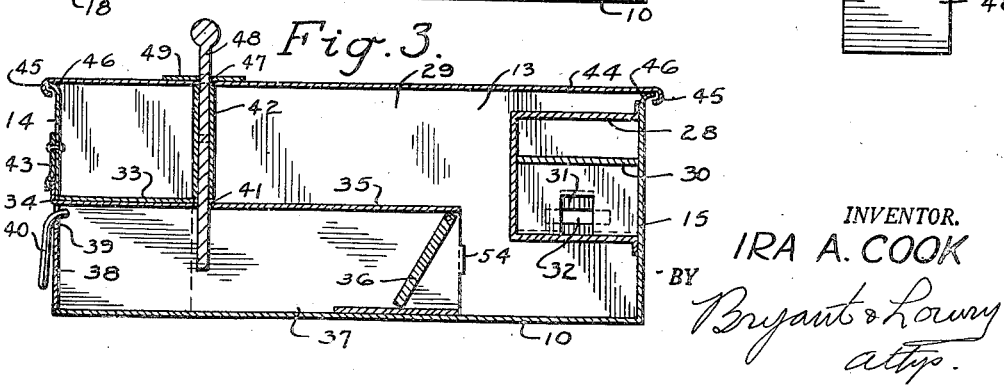
INVENTOR.
IRA A. COOK
BY
Bryant & Lowry
attys.

Patented Sept. 13, 1949

2,481,907

UNITED STATES PATENT OFFICE 2,481,907

MOUSETRAP

Ira A. Cook, Milan, Mo.

Application October 13, 1947, Serial No. 779,491

2 Claims. (Cl. 43—76)

This invention relates to traps such as are used for mice and other like rodents.

One important object of the invention is to provide a novel form of mouse trap with an improved arrangement of non-return passages.

Another important object of the invention is the provision of a novel mouse trap having means whereby a caught mouse may be killed within the trap.

A further object of the invention is to provide a novel form of trap into which several mice may enter, one after another, without the presence of mice in the trap deterring another mouse from entering.

A still further object of the invention is to provide a novel trap wherein one mouse may be killed without disturbing other mice in the trap.

Still another object of the invention is to provide a death chamber in such a trap of such character that only one mouse may enter at a time.

Another important object is to so arrange the trap that a mouse killed in the death chamber may be removed without possibility of escape of any mice remaining in the trap.

With the above and other objects in view, as will be presently apparent, the invention consists in general of certain novel details of construction and combinations of parts hereinafter fully described, illustrated in the accompanying drawings and particularly claimed.

In the accompanying drawings like characters of reference indicate like parts in the several views, and:

Figure 1 is a perspective view of the invention with the top and the parts carried thereby removed to better show the interior.

Figure 2 is a section on the plane 2—2 of Figure 1.

Figure 3 is a section on the plane 3—3 of Figure 1.

Figure 4 is a fragmentary perspective view of a portion of the top and disclosing the killer blade.

Figure 5 is a detail view, partly in section, of the killer blade arrangement.

Figure 6 is a perspective view of the bait holder used in this invention.

In the embodiment of the invention as herein disclosed there is provided a generally rectangular construction having a metal bottom or floor 10 which have air vents 11 therein. Rising from one side edge of the bottom 10 is a side wall 12. This wall is preferably made of wood so as to give stiffness against distortion of the remaining metal parts. The opposite wall 13 is preferably of metal. At the front of the trap is a wall 14 and at the rear is a wall 15, these walls connecting, of course, with the walls 11 and 12 and being of equal height therewith.

Spaced inwardly of and parallel to the wall 12 is a partition 16 and between this partition and the wall 12 the front wall is provided with a door opening 17 having at its bottom edge a lip or sill 18. The space between the portion 16 and wall 12 forms the entry hall for the mice. In the lower part of this entry hall is a false bottom 19 pivoted as at 20 in the wall 12 and partition 16. Normally the front end of the false bottom 19 rests on the sill 18 but when a mouse enters and passes beyond the pivot 20 the false bottom tilts as shown by the broken lines in Figure 2. In the upper front part of the entry hall is pivoted a door 21 which is connected to the front corners of the false bottom by links 22. By this arrangement when the rear end of the false bottom 19 tilts down under the weight of an entering mouse the front door closes and the mouse cannot escape since, as shown by the broken line position in Figure 2, he cannot get on the front part of the false bottom. At the rear end of the entry hall the rear wall 15 is provided with an opening 24 and on the outside of this rear wall is located a receptacle 25 wherein is slidably fitted a perforated bait pocket 26. Thus the mouse is attracted to enter the entry hall.

At the rear upper end of the trap the partition 16 is cut away to produce an opening 27 which opens into the entry end of a rectangular tubular member 28 affording passage from the entry hall side of the partition to a chamber 29 on the other side thereof. Suspended from the upper part of member 28 is a swinging door 30 opening only towards the chamber 29. This door is provided with a small notched portion or opening 31 so that a mouse in this end of the entry hall may see a slit 32 in the wall 13 affording an apparent route of escape. This causes the mouse to push the door 30 up and to pass into the chamber 29 which, for convenience, may be called the play chamber. In the chamber 29 against the partition 16 is a rectangular collar or guide 33 which opens through the front wall 14 at 34.

Slidably mounted in this guide 33 is a rectangular tubular structure 35 constituting a death tube. This tube 35 has at its inner end a drop door 36 and is open at its bottom as at 37. This death tube has its front end 38 partially closed so as to leave an apparent escape opening 39, this end being provided with a pull loop 40 for ease in withdrawing the tube. Also the death tube has in its top a blade slot 41. Carried by the inner end of the guide 33 is a vertical blade guide 42 the lower end of which normally registers with the slot 41. The death tube may be restrained from outward movement by a turnbutton 43.

The trap is provided with a removable cover 44 the end edges 45 of which are bent downwardly and inwardly to engage turned edges 46 on the front and back walls 14 and 15. By this means the cover may be slid laterally into engagement with the body of the trap and may there be secured in a manner presently to be described or may be removed so that the interior of the trap is exposed for cleansing. In the cover is a blade slot 47 which, when the cover is in closed position, registers with the upper end of the blade guide 42. A blade 48 normally extends downwardly through the slot 47 and into the guide 42. This blade is removable but so long as it is in the position just described it locks the cover against removal. A rotatable disc 49 is pivoted on the cover 44 adjacent one edge of the blade when in the slot 47, the periphery of the disc slightly overlapping one end of said slot and being provided with one or more notches 50 which, by rotation of the disc, may be brought into registry with the slot. The edge of the blade adjacent the disc 49 is provided with three notches, an upper notch 51, a lower notch 52 and a still lower notch 53, the two latter being well below the upper notch but close together. These notches are of such size as to embrace the periphery of the disc 49.

In setting the trap bait is, of course, placed in the bait holder 26 and the latter put in position. The disc 49 is turned until a notch 50 registers with the slot 47 and the blade 48 inserted. At this time the death chamber is held in by the turnbutton 43 so that the knife may pass down to have its lower end project through the slot 41. When the lower edge of the blade just projects through the slot 41 the notch 52 will be just above the cover 44 and in such position that the disc 49 may be rotated to have its periphery engage in notch 52. Thus the blade will be held raised while, at the same time, it will prevent movement of the death chamber. When a mouse has entered the death chamber the disc 49 is turned to again register with a notch 50 with the slot 47 and the blade is pressed down to kill the mouse. The blade may be locked in killing position by rotation of the disc 49 to have its periphery engage in notch 51. After the mouse is dead the blade is raised, a notch 50 and slot 47 being alined, until rotation of the disc 49 will cause its pheriphery to engage in notch 53 and the disc is rotated to effect such engagement. Under these conditions the knife will be raised clear of engagement through the slot 41 and, upon turning of the button 43 the death chamber may be drawn out so that the dead mouse will drop out of the open bottom 37.

A stop lug 54 is provided on the rear end of the death chamber to prevent total withdrawal thereof and thus to prevent escape of live mice from the trap.

What is claimed is:

1. In a mouse trap, a body having an entry opening, a plurality of door-trapped passages leading from said opening, a death chamber leading from the last of said passages and having a top wall and an entry end, a trap door at said entry end, said death chamber being mounted for sliding movement through a wall of said body, said death chamber further having a delivery opening for dead mice in its bottom, a blade slot in its top wall, and a blade movable into and out of said death chamber through said slot, and a guide for said blade fixed within said body and registering with the blade slot upon the death chamber being in its innermost position, said body having a slidably mounted top provided with a blade slot registering with the guide, upon the top being in fully body closing position.

2. In a mouse trap, a body having an entry opening, a plurality of door-trapped passages leading from said opening, a death chamber leading from the last of said passages and having a top wall and an entry end, a trap door at said entry end, said death chamber being mounted for sliding movement through a wall of said body, said death chamber further having a delivery opening for dead mice in its bottom, a blade slot in its top wall, and a blade movable into and out of said death chamber through said slot, a guide for said blade fixed within said body and registering with the blade slot upon the death chamber being in its innermost position, said body having a slidably mounted top provided with a blade slot registering with the guide, upon the top being in fully body closing position, and cooperating means on the blade and said top for holding the blade in adjusted position relative to said guide and the death chamber.

IRA A. COOK.

REFERENCES CITED

The following references are of record in the file of this patent:

UNITED STATES PATENTS

| Number | Name | Date |
|---|---|---|
| 128,802 | Lampkin | July 9, 1872 |
| 1,382,416 | Dresser | June 21, 1921 |
| 1,948,586 | Mace | Feb. 27, 1934 |